(12) United States Patent
Marsh

(10) Patent No.: US 9,186,970 B1
(45) Date of Patent: Nov. 17, 2015

(54) TRUCK BED EXTENSION COVER

(71) Applicant: Walter Marsh, Ketchikan, AK (US)

(72) Inventor: Walter Marsh, Ketchikan, AK (US)

( * ) Notice: Subject to any disclaimer, the term of this patent is extended or adjusted under 35 U.S.C. 154(b) by 0 days.

(21) Appl. No.: 14/300,323

(22) Filed: Jun. 10, 2014

(51) Int. Cl.
*B60J 7/16* (2006.01)
(52) U.S. Cl.
CPC ..................... *B60J 7/1621* (2013.01)
(58) Field of Classification Search
CPC .................. B60J 7/1621; B60J 7/02
USPC ............ 296/100.06, 26.11, 26.08, 57.1, 37.1, 296/37.6
See application file for complete search history.

(56) References Cited

U.S. PATENT DOCUMENTS

| | | | |
|---|---|---|---|
| 3,514,152 A | 5/1970 | Hermon | |
| 3,765,717 A | 10/1973 | Gavert | |
| D329,998 S | 10/1992 | Sutton et al. | |
| 5,183,309 A | 2/1993 | Jordan | |
| D434,361 S | 11/2000 | Block et al. | |
| 6,203,086 B1 | 3/2001 | Dirks et al. | |
| 6,254,169 B1 | 7/2001 | Arthur | |
| 6,340,194 B1 | 1/2002 | Muirhead et al. | |
| 6,439,639 B1 * | 8/2002 | Branting | 296/100.09 |
| 6,588,826 B1 | 7/2003 | Muirhead | |
| 7,052,071 B2 | 5/2006 | Mulder et al. | |
| 7,131,684 B1 * | 11/2006 | Gooding | 296/100.09 |
| 2013/0270854 A1 * | 10/2013 | Weller | 296/37.6 |

* cited by examiner

*Primary Examiner* — Joseph D Pape
*Assistant Examiner* — Dana Ivey
(74) *Attorney, Agent, or Firm* — Kyle A. Fletcher, Esq.

(57) ABSTRACT

The truck bed extension cover includes two cover members that operate independent of one another, and which are both affixed to a hinge member. The hinge member is specially adapted to attach itself to a rear surface of a truck bed toolbox such that the two cover members extend over the remaining portion of a truck bed in order to provide coverage thereon. The two cover members are generally parallel with one another, and rotate with respect to the hinge member in order to raise and lower with respect to a tailgate of said truck bed. The two cover members are further defined with a driver side cover member and a passenger side cover member. Both of the cover members include lock handles and a lift cylinder to aid in manipulation of the respective cover member.

14 Claims, 6 Drawing Sheets

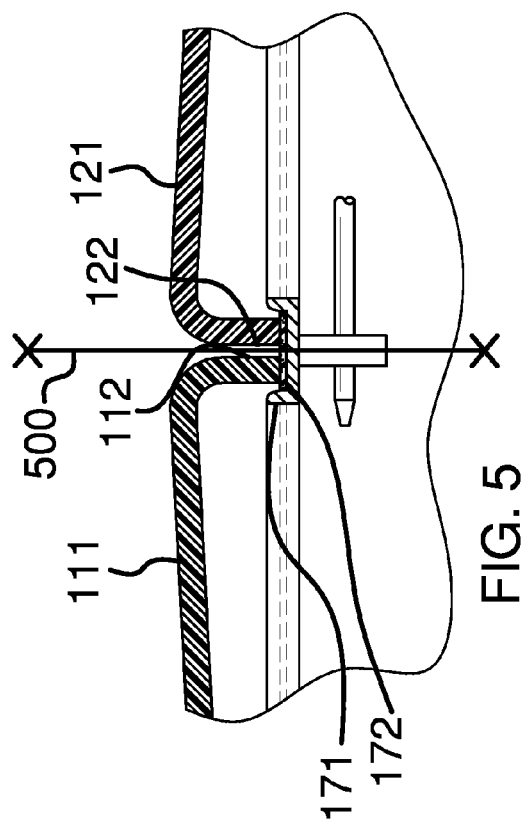
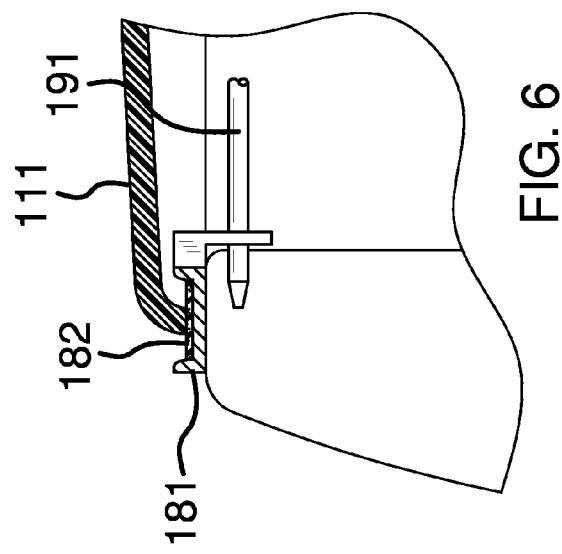

TRUCK BED EXTENSION COVER

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

A. Field of the Invention

The present invention relates to the field of truck bed covers, more specifically, a truck bed cover that involves two cover members that operate independent of one another.

SUMMARY OF THE INVENTION

An embodiment of the disclosure meets the needs presented above by generally comprising a two cover members that operate independent of one another, and which are both affixed to a hinge member. The hinge member is specially adapted to attach itself to a rear surface of a truck bed toolbox such that the two cover members extend over the remaining portion of a truck bed in order to provide coverage thereon. The two cover members are generally parallel with one another, and rotate with respect to the hinge member in order to raise and lower with respect to a tailgate of said truck bed. The two cover members are further cover member. Both of the cover members include lock handles and a lift cylinder to aid in manipulation of the respective cover member.

An object of the invention is to provide a device that is a truck bed cover that is adapted to work with a truck bed tool box in order to enclose off the remaining space of the truck bed.

Another object of the invention is to provide a truck bed cover that includes two cover members that operate independent of one another.

These together with additional objects, features and advantages of the truck bed extension cover will be readily apparent to those of ordinary skill in the art upon reading the following detailed description of presently preferred, but nonetheless illustrative, embodiments of the truck bed extension cover when taken in conjunction with the accompanying drawings.

In this respect, before explaining the current embodiments of the truck bed extension cover in detail, it is to be understood that the truck bed extension cover is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of truck bed extension cover.

It is therefore important that the claims be regarded as including such equivalent construction insofar as they do not depart from the spirit and scope of truck bed extension cover. It is also to be understood that the phraseology and terminology employed herein are for purposes of description and should not be regarded as limiting.

BRIEF DESCRIPTION OF THE DRAWINGS

The disclosure will be better understood and objects other than those set forth above will become apparent when consideration is given to the following detailed description thereof. Such description makes reference to the annexed drawings wherein:

FIG. 5 is a close-up detail view of the truck bed extension cover.

FIG. 6 is another close-up detail view of the truck bed extension cover.

DETAILED DESCRIPTION OF THE EMBODIMENT

Figure 1:
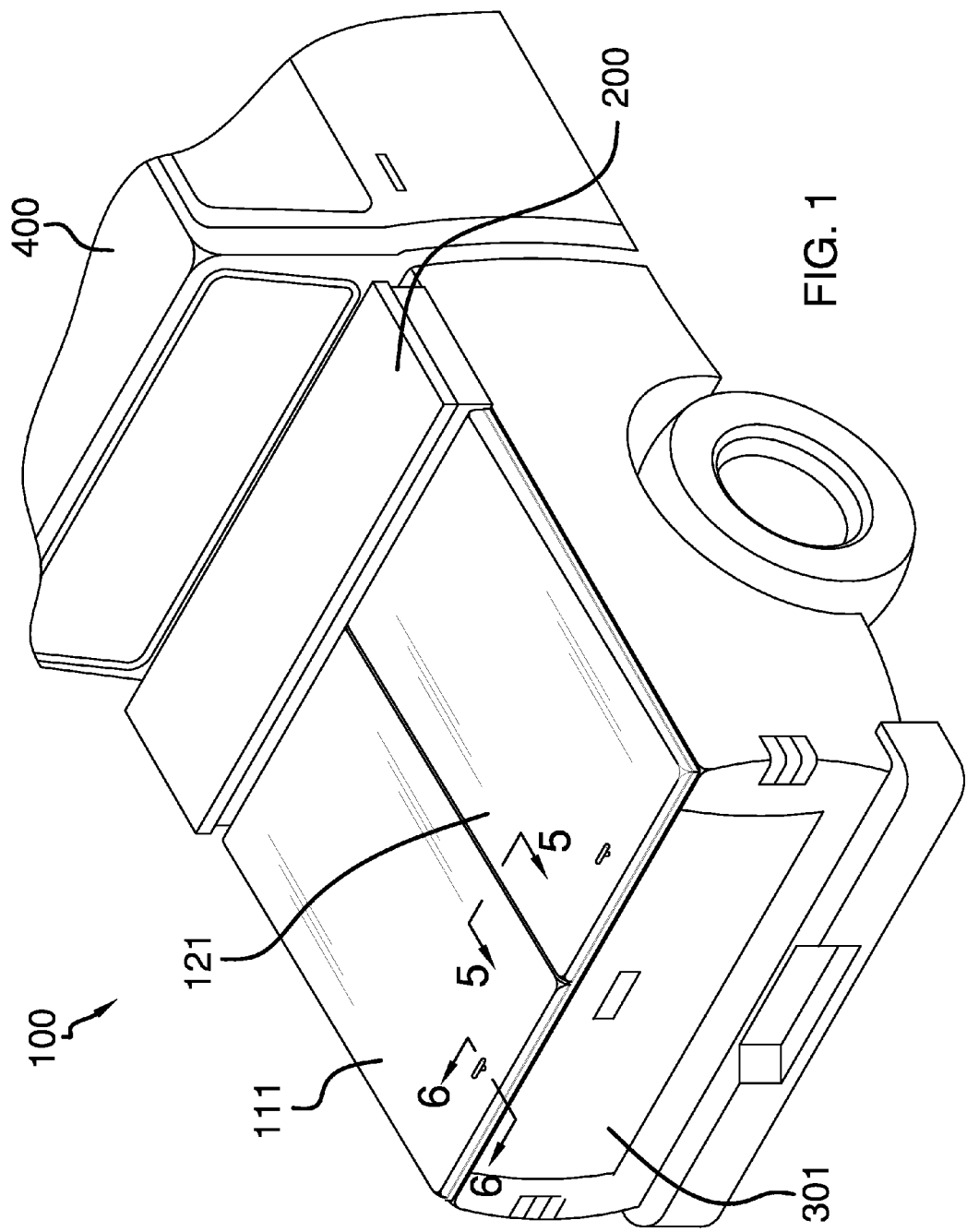
FIG. 1 is a perspective view of the truck bed extension cover.
Figure 2:
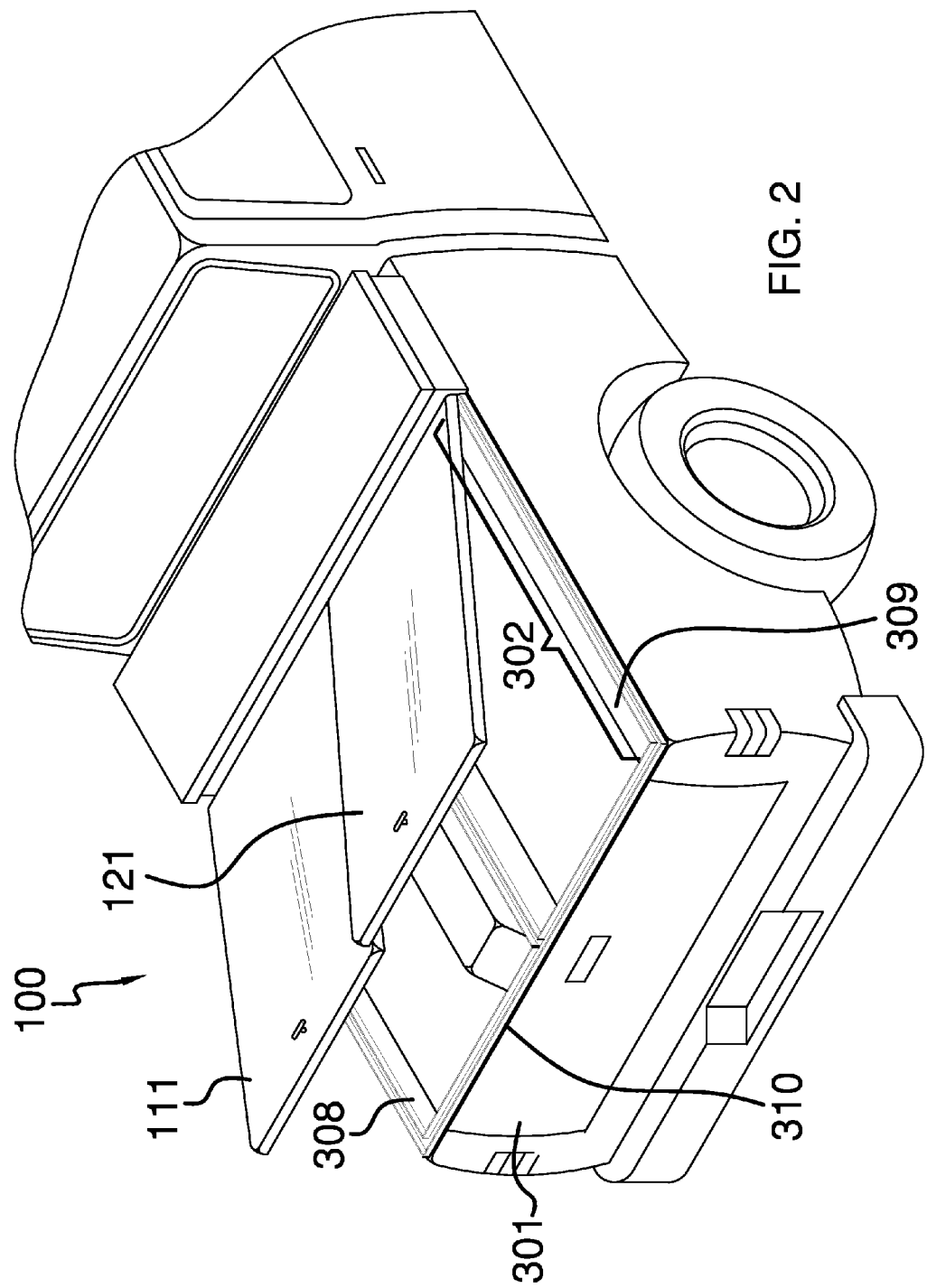
FIG. 2 is a second perspective view of the truck bed extension cover.

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

As best illustrated in FIGS. 1 through 7, the truck bed extension cover 100 (hereinafter invention) generally comprises a hinge member 101 that is configured to attach to a truck bed toolbox 200. It shall be noted that the term "truck bed toolbox 200" is being used to refer to toolboxes that mount and hang on a forwardmost portion of a truck bed 300. That being said, the invention 100 is designed to act as a truck bed cover for the portion of the truck bed 300 that remains exposed from the truck bed toolbox 200 to a tailgate 301. The invention 100 is designed to cover a rear portion 302 of the truck bed 300 of a truck 400.

The hinge member 101 attaches to a rear surface 201 of the truck bed toolbox 200. Moreover, the hinge member 101 is affixed to a driver side cover member 111 as well as a passenger side cover member 121. The driver side cover member 111 is parallel with the passenger side cover member 121. The driver side cover member 111 is able to open and close independent of the passenger side cover member 121. The driver side cover member 111 is a mirror image of the passenger side cover member 121. The driver side cover member 111 and the passenger side cover member 121 collectively are adapted to engage a top left side truck bed surface 308 and a top right side truck bed surface 309 as well as a top tailgate surface 310.

Figure 3:
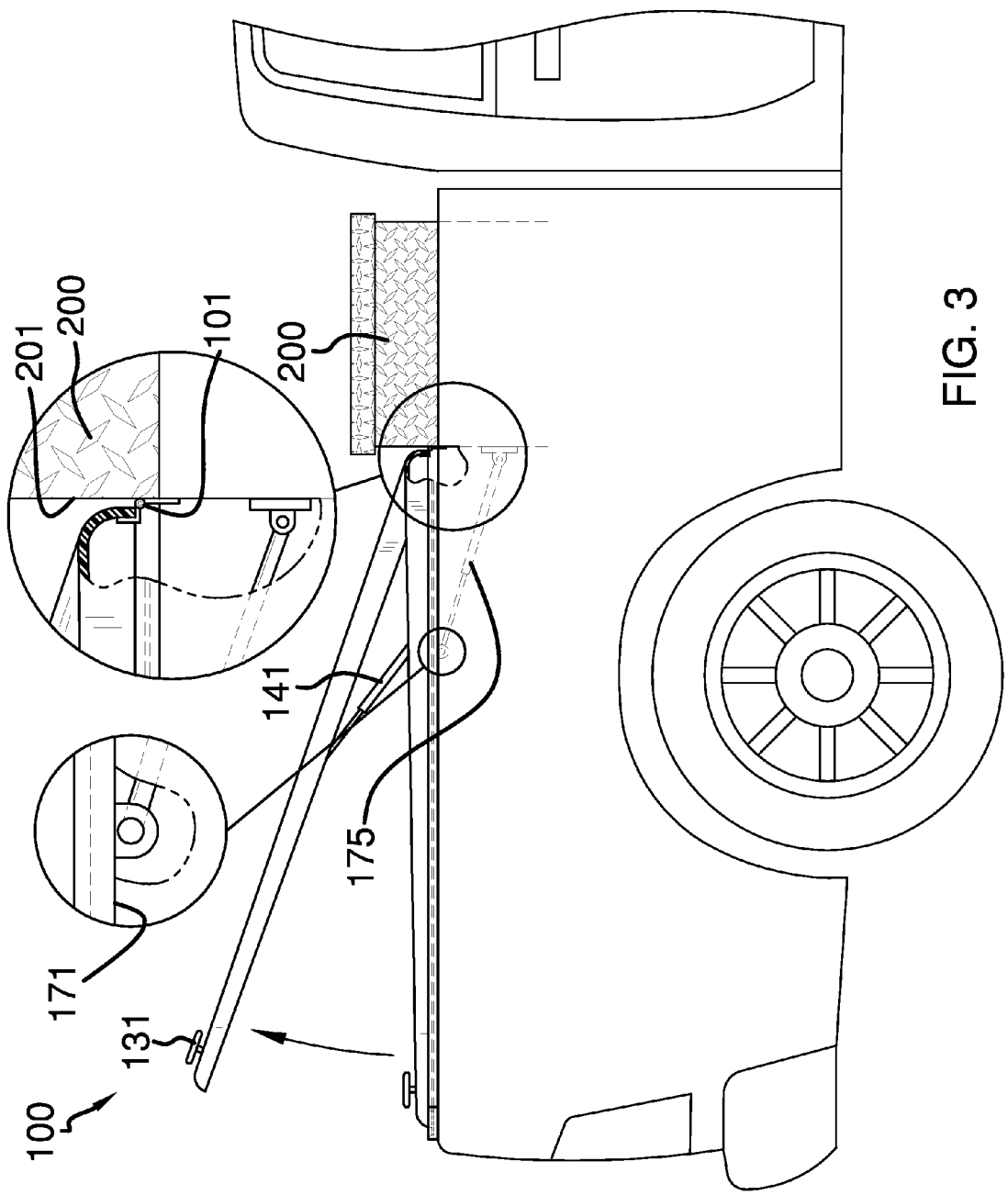
FIG. 3 is a side view of the truck bed extension cover.
Figure 4:
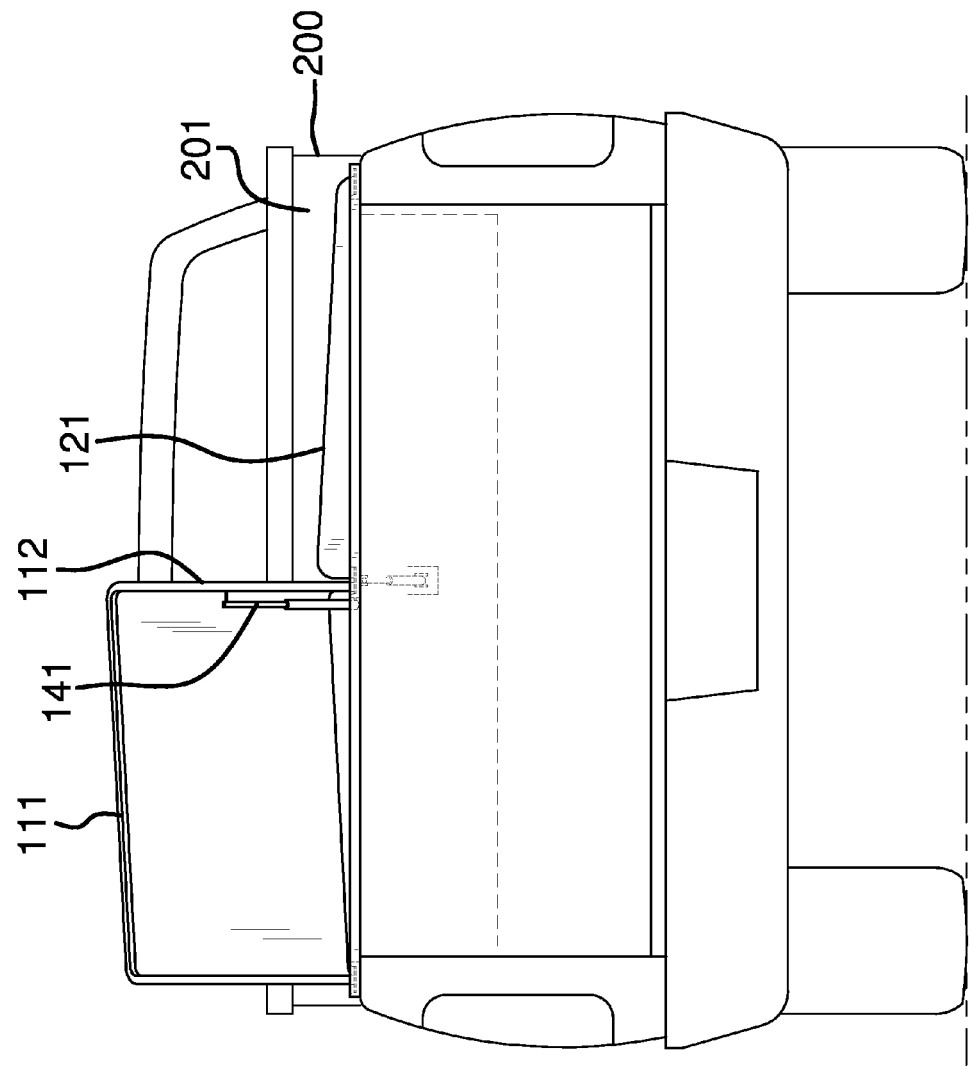
FIG. 4 is a rear view of the truck bed extension cover.
Figure 7:
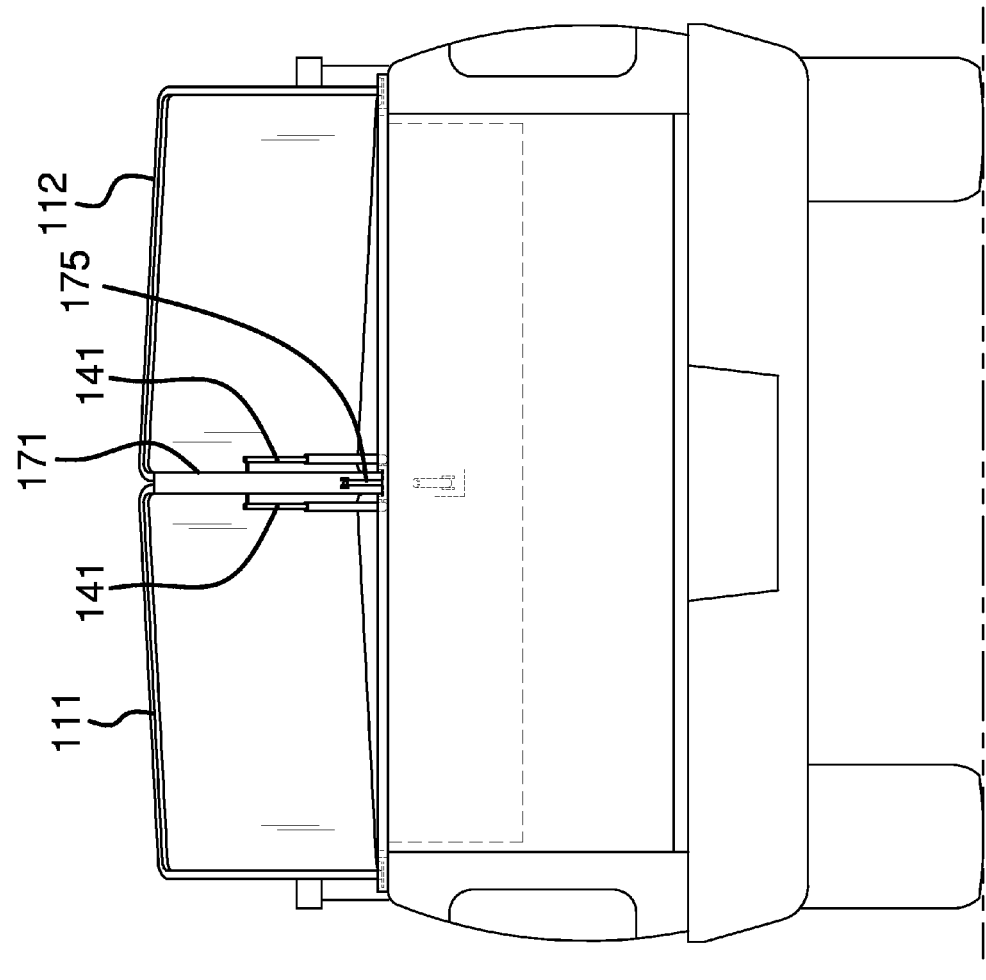
FIG. 7 is a rear view of the truck bed extension cover.

Referring to FIGS. 3 and 4, both the driver side cover member 111 as well as the passenger side cover member 121 include a locking handle 131 and a lift cylinder 141. The locking handle 131 is able to lock and unlock the respective cover member, and is commonly known in the art pertaining to truck bed covers. The lift cylinder 141 is also commonly known in the art unit, and provides mechanical power needed to raise and lower the respective cover member with respect to the truck bed 300. The lift cylinders 141 are located adjacent a middle axis 500, which defines a right edge 112 of the driver side cover member 111 from a left edge 122 of the passenger side cover member 121.

Referring to FIG. 5, a center support channel 171 may be included with the invention 100. The center support channel 171 is included to support the driver side cover member 111 as well as the passenger side cover member 121 along the middle axis 500. It shall be noted that the center support channel 171 may extend from the toolbox 200 to the tailgate 301 if additional support is required. However, the center support channel 171 may simply extend adjacent the rear surface 201 of the toolbox 200, and not extend rearwardly with respect to the truck bed 300. The center support channel 171 may include a center rubber member 172 to form a watertight seal between the driver side cover member 111 and the passenger side cover member 121.

The center support channel 171 may include a center lift cylinder 175 that raises and lowers the center support channel 171 with respect to the hinge member 101. Moreover, the center lift cylinder 175 would work in concert with the lift cylinders 141 in order to raise the driver side cover member 111 and the passenger side cover member 121 in concert.

That being said, in FIG. 6, an edge support member 181 is adapted to extend along the top left side truck bed surface 308 and the top right side truck bed surface 309 as well as a top tailgate surface 310. The edge support member 181 may include an edge rubber member 182 to form a watertight seal between the truck bed 300 and the driver side cover member 111 as well as the passenger side cover member 121.

Also, a handle locking rod 191 may extends across the truck bed 300 in order for the locking handles 131 of the driver side cover member 111 and the passenger side cover member 121 to engage.

With respect to the above description, it is to be realized that the optimum dimensional relationship for the various components of the invention 100, to include variations in size, materials, shape, form, function, and the manner of operation, assembly and use, are deemed readily apparent and obvious to one skilled in the art, and all equivalent relationships to those illustrated in the drawings and described in the specification are intended to be encompassed by the invention 100.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A truck bed extension cover comprising:
   a hinged member adapted to be secured to a rear surface of a truck bed toolbox; and
   a driver side cover member as well as a passenger side cover member are attached to the hinged member;
   wherein the driver side cover member rotates independent of the passenger side cover member;
   wherein both the driver side cover member and the passenger side cover member are collectively adapted to provide coverage of a rear portion of a truck bed, which is defined as the portion extending from the rear surface of the truck bed toolbox and a tailgate;
   wherein the driver side cover member is parallel with the passenger side cover member;
   wherein the driver side cover member is able to open and close independent of the passenger side cover member;
   wherein the driver side cover member is a mirror image of the passenger side cover member;
   wherein the driver side cover member and the passenger side cover member collectively are adapted to engage a top left side truck bed surface and a top right side truck bed surface as well as a top tailgate surface;
   wherein both the driver side cover member as well as the passenger side cover member include a locking handle and a lift cylinder;
   wherein the lift cylinders are located adjacent a middle axis, wherein the middle axis defines a right edge of the driver side cover member from a left edge of the passenger side cover member.

2. The truck bed extension cover according to claim 1 wherein a center support channel is included to support the driver side cover member as well as the passenger side cover member along the middle axis.

3. The truck bed extension cover according to claim 2 wherein the center support channel includes a center rubber member to form a watertight seal between the driver side cover member and the passenger side cover member.

4. The truck bed extension cover according to claim 3 wherein the center support channel includes a center lift cylinder that raises and lowers the center support channel with respect to the hinge member; wherein the center lift cylinder works with the lift cylinders in order to raise the driver side cover member and the passenger side cover member in concert.

5. The truck bed extension cover according to claim 4 wherein an edge support member is adapted to extend along the top left side truck bed surface and the top right side truck bed surface as well as a top tailgate surface.

6. The truck bed extension cover according to claim 5 wherein the edge support member include an edge rubber member to form a watertight seal between the truck bed and the driver side cover member or the passenger side cover member.

7. The truck bed extension cover according to claim 6 wherein a handle locking rod extends across the truck bed in order for the locking handles of the driver side cover member and the passenger side cover member to engage, and lock the respective cover member to the truck bed.

8. A truck bed extension cover comprising:
   a hinged member adapted to be secured to a rear surface of a truck bed toolbox; and
   a driver side cover member as well as a passenger side cover member are attached to the hinged member;
   wherein the driver side cover member rotates independent of the passenger side cover member;
   wherein both the driver side cover member and the passenger side cover member are collectively adapted to provide coverage of a rear portion of a truck bed, which is defined as the portion extending from the rear surface of the truck bed toolbox and a tailgate;
   wherein the driver side cover member and the passenger side cover member collectively are adapted to engage a top left side truck bed surface and a top right side truck bed surface as well as a top tailgate surface;
   wherein both the driver side cover member as well as the passenger side cover member include a locking handle and a lift cylinder;

wherein the lift cylinders are located adjacent a middle axis, wherein the middle axis defines a right edge of the driver side cover member from a left edge of the passenger side cover member;

wherein a center support channel is included to support the driver side cover member as well as the passenger side cover member along the middle axis.

9. The truck bed extension cover according to claim 8 wherein the driver side cover member is parallel with the passenger side cover member.

10. The truck bed extension cover according to claim 9 wherein the driver side cover member is able to open and close independent of the passenger side cover member; wherein the driver side cover member is a mirror image of the passenger side cover member.

11. The truck bed extension cover according to claim 10 wherein the center support channel includes a center rubber member to form a watertight seal between the driver side cover member and the passenger side cover member; wherein the center support channel includes a center lift cylinder that raises and lowers the center support channel with respect to the hinge member; wherein the center lift cylinder works with the lift cylinders in order to raise the driver side cover member and the passenger side cover member in concert.

12. The truck bed extension cover according to claim 11 wherein an edge support member is adapted to extend along the top left side truck bed surface and the top right side truck bed surface as well as a top tailgate surface.

13. The truck bed extension cover according to claim 12 wherein the edge support member include an edge rubber member to form a watertight seal between the truck bed and the driver side cover member or the passenger side cover member.

14. The truck bed extension cover according to claim 13 wherein a handle locking rod extends across the truck bed in order for the locking handles of the driver side cover member and the passenger side cover member to engage, and lock the respective cover member to the truck bed.

* * * * *